(12) United States Patent
Kwon et al.

(10) Patent No.: US 7,227,123 B2
(45) Date of Patent: Jun. 5, 2007

(54) PHYSICAL QUANTITY MEASURING METHOD USING BRILLOUIN OPTICAL FIBER SENSOR

(75) Inventors: Il Bum Kwon, Daejeon (KR); Dong Jin Yoon, Daejeon (KR); Jeong Joo Lee, Daejeon (KR); Sang Hun Kim, Gyeonggi-do (KR)

(73) Assignees: Korea Advanced Institute of Science and Technology (KR); Korea Research Institute of Standards and Science (KR)

( * ) Notice: Subject to any disclaimer, the term of this patent is extended or adjusted under 35 U.S.C. 154(b) by 143 days.

(21) Appl. No.: 11/062,714

(22) Filed: Feb. 22, 2005

(65) Prior Publication Data

US 2005/0207752 A1 Sep. 22, 2005

(30) Foreign Application Priority Data

Feb. 25, 2004 (KR) .................. 10-2004-0012757

(51) Int. Cl.
*G01J 1/04* (2006.01)
*H01S 3/00* (2006.01)
*G02B 6/00* (2006.01)
*G01N 21/00* (2006.01)

(52) U.S. Cl. .................. 250/227.14; 359/334; 385/12; 356/73.1

(58) Field of Classification Search .......... 250/227.14, 250/227.19; 356/32, 73.1; 385/12, 25, 42, 385/122, 123; 398/31; 359/334
See application file for complete search history.

(56) References Cited

U.S. PATENT DOCUMENTS

2006/0018586 A1* 1/2006 Kishida .................. 385/12

OTHER PUBLICATIONS

Marc Nikles, Simple distributed fiber sensor based on Brillouin gain spectrum analysis, May 15, 1996, Optics Letters, vol. 21, No. 10, Optical Society of America, Switzerland.
Optical Fiber Strain Analyzer AQ8603, Measuring the strain disctribution in the fiber axial direction from one end, www.ando.com, Ando, Japan.

* cited by examiner

*Primary Examiner*—Georgia Epps
*Assistant Examiner*—Don Williams
(74) *Attorney, Agent, or Firm*—DeMont & Breyer, LLC

(57) ABSTRACT

Provided is a physical quantity measuring method using a Brillouin optical fiber sensor. An optical fiber is set on a structure and a pair of pulse lights having different pulse widths is selected. The pulse lights are sequentially transmitted through the optical fiber to obtain back scattering lights and Brillouin gain spectra. The Brillouin gain spectra are compared to each other to calculate a normalized spectrum and a Brillouin frequency is acquired based on the normalized spectrum. The Brillouin frequency is multiplied by a conversion factor of a corresponding physical quantity of the structure to obtain the physical quantity. Accordingly, a portion of the optical fiber from which a sensing signal can be acquired is shortened to improve spatial resolution.

14 Claims, 11 Drawing Sheets

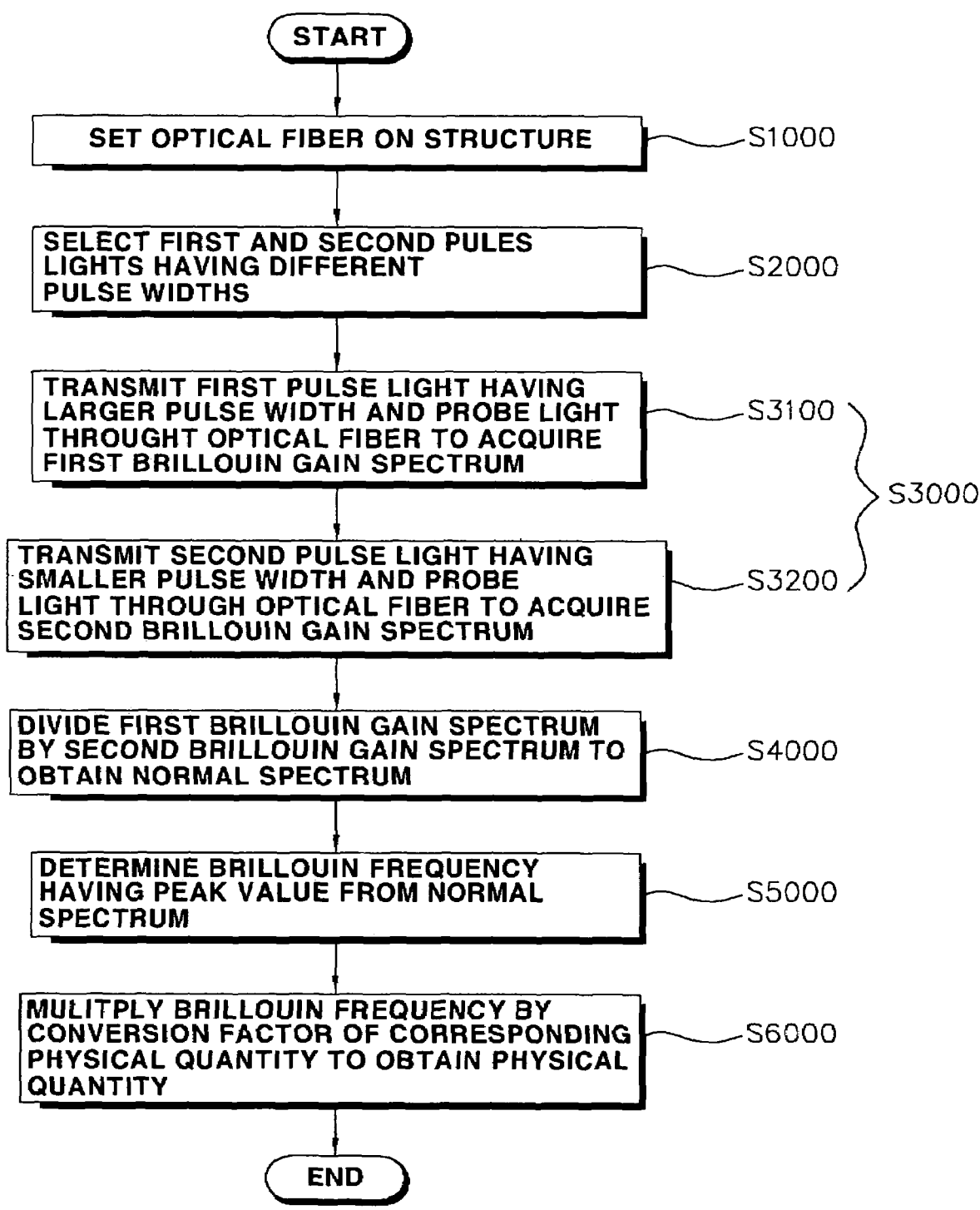

PHYSICAL QUANTITY MEASURING METHOD USING BRILLOUIN OPTICAL FIBER SENSOR

CROSS-REFERENCE TO RELATED APPLICATIONS

This application claims priority of Republic of Korea patent application number KR 10-2004-0012757, filed Feb. 25, 2004, which is incorporated herein by reference.

BACKGROUND OF THE INVENTION

1. Field of the Invention

The present invention relates to a method of measuring a physical variation in a static structure (a bridge, a building and so on) or a dynamic structure (an airplane, a vehicle and so on) using an optical fiber and Brillouin scattering of the optical fiber. More specifically, the invention relates to a physical quantity measuring method using a Brillouin optical fiber sensor, which is able to measure a physical quantity and its distribution of a corresponding structure with improved spatial resolution using two pulse lights and two back scattering lights acquired from the pulse lights.

2. Background of the Related Art

It is generally known that Brillouin scattering relates to a sound wave generated according to movement of molecules physically excited in a gas, liquid or solid. There has been developed a Brillouin optical fiber sensor using the Brillouin scattering of an optical fiber. The Brillouin sensor has a structure that a pulse light is reacted with an oscillating wave inside an optical fiber when the pulse light is transmitted through the optical fiber such that the pulse light is scattered at a frequency different from the frequency of the original pulse light. If a specific physical quantity (heat, load and so on) is applied to the optical fiber, molecules of the optical fiber, which are excited due to the physical quantity, form a sound wave and act on the pulse light. Accordingly, the scattered pulse light has a frequency different from the frequency of the pulse light when the pulse light is input to the optical fiber. The physical quantity can be measured by detecting the frequency of the scattered pulse light. Thus, the Brillouin optical fiber sensor can be utilized as a sensing structure.

FIG. 1 shows the construction of a conventional Brillouin sensor and FIG. 2 shows a Brillouin gain spectrum obtained by measuring temperature distribution of a specific structure using the sensor of FIG. 1.

Referring to FIG. 1, first and second light sources 20 and 30 are respectively arranged at both ends of an optical fiber 10, opposite to each other. The first light source 20 arranged at one end of the optical fiber 10 transmits a pumping pulse light to the other end of the optical fiber 10. The second light source 30 located at the other end of the optical fiber 10 transmits a continuous wave probe light to one end of the optical fiber 10. A portion of the optical fiber 10, exposed between the first and second light sources 20 and 30, is attached to a specific structure (a building, a bridge and so on, for instance) to serve as a sensing part.

When a light receiver 40 is connected to the optical fiber 10, the portion of the optical fiber 10, which is attached to the structure, functions as a sensing structure. Thus, the frequency of scattered light transmitted in response to a variation in the temperature of the structure can be compared with a difference between the frequency of the pumping pulse light and the frequency of the probe light. Furthermore, a structure capable of measuring a temperature is based on the fact that the frequency of the scattered light is changed as a temperature becomes changed.

When the frequency of the pumping pulse light input to one end of the optical fiber 10 is $v_p$ and the frequency of the continuous wave probe light input to the other end of the optical fiber 10 is $v_{cw}$, the difference between the frequencies of the pumping pulse light and probe light corresponds to $\Delta v = v_p - v_{cw}$.

When the frequencies of the pumping pulse light and probe light are adjusted such that $\Delta v$ corresponds to a Brillouin frequency shift of the optical fiber 10, the pumping pulse light is photo-energy-converted into the probe light and thus the probe light is amplified as Brillouin-light inside the optical fiber 10. Accordingly, analysis of Brillouin signals is facilitated.

The amplified probe light signal is converted into an electric signal by the light receiver 40. The electric signal has Brillouin gain spectrum characteristic shown in FIG. 2 based on $\Delta v$ and time detected by the light receiver.

When the optical fiber 10 attached to the surface of the structure is subjected to a variation due to a temperature, for example, the Brillouin frequency value of the optical fiber 10 is changed as shown in FIG. 2.

The molecules of the optical fiber are thermally excited when the probe light meets the pumping pulse light to cause sound oscillation and generate Brillouin scattering light. This Brillouin scattering amplification is generated when the difference between the frequencies of the pumping pulse light and probe light has a specific value, which is the Brillouin frequency value. The Brillouin frequency value is a property of the optical fiber and it is varied in proportion to a physical quantity such as a temperature or strain.

When the Brillouin frequency shift corresponds to $\Delta v$, the maximum power of the optical fiber is obtained. FIG. 2 shows the distribution of the frequency shift value based on a frequency axis, an optical intensity axis (mW) and a length (km) of the sensing part of the optical fiber 10. The frequency shift $\Delta v$ is shown to 10.8 GHz, 10.85 GHz, 10.9 GHz and 10.95 GHz on the frequency axis. A temperature variation based on the distribution of the frequency shift is shown as a graph above the graph showing the distribution of the frequency shift. The larger the number of $\Delta v$ frequency shifts set on the frequency axis, the more accurate the distribution of the frequency shift is.

However, the conventional Brillouin sensor requires the structure in which the two light sources, that is, the first and second light sources 20 and 30, are arranged at both ends of the optical fiber 10 in order to acquire data about $\Delta v$ and needs a very long period of time to obtain measurement results because the probe light of the second light source 30 is emitted in the form of pulse light. Accordingly, when the conventional Brillouin sensor is applied to a large structure, a factor causing a temperature variation, for example, a fire, cannot be immediately detected.

In the Brillouin optical fiber sensor structure, it is very important how long portion of the optical fiber is effective as a sensing part used for measuring a physical quantity. The size (or length) of a portion of the Brillouin optical fiber sensor, affected by a physical quantity based on a measured value at an arbitrary position, is called spatial resolution.

When the spatial resolution of an optical fiber sensor is 1 m, for example, it means that a single sensing signal is obtained within 1 m of a corresponding portion of the optical fiber. It is known that the spatial resolution is directly proportional to the width of the pumping pulse light in the optical fiber sensor structure.

A portion of the optical fiber, in which pumping pulse light is back-scattered, corresponds to half of the length of the optical fiber, occupied by the pumping pulse light. Thus, when the width of the pulse light is 10 nsec, the spatial resolution becomes 1 m (that is equal to 200,000 km/s×10 nsec×½) considering that the velocity of light transmitted inside the optical fiber is approximately 200,000 km/s.

Accordingly, a signal having the spatial resolution of 1 m is obtained when the optical fiber sensor is operated using the pumping pulse light with the pulse width of 10 nsec. To obtain the more accurate signal from the corresponding length of the optical fiber, it is required to operate the optical fiber sensor with smaller spatial resolution. In this case, however, the scattering light is decreased because the energy of the pumping pulse light is reduced.

It is known that the Brillouin scattering light amplification occurs only when a pulse light with a pulse width of at least 10 nsec is used and it is difficult to determine a gain peak with a pulse width of less than 50 nsec because the line width of the Brillouin scattering spectrum is remarkably increased.

SUMMARY OF THE INVENTION

Accordingly, the present invention is directed to a physical quantity measuring method using a Brillouin optical fiber sensor that substantially obviate one or more problems due to limitations and disadvantages of the related art.

An object of the present invention is to provide a physical quantity measuring method using a Brillouin optical fiber sensor, which is able to measure a physical quantity by using a pair of pulse lights having different pulse widths and comparing obtained gain spectra with each other.

Another object of the present invention is to provide a physical quantity measuring method using a Brillouin optical fiber sensor, which obtains a normal spectrum with a short back scattering light accumulation length by comparing obtained gain spectra with each other and measures a physical quantity based on the normal spectrum to enable measurement of a sensing signal in a short optical fiber portion, to thereby remarkably enhance spatial resolution. The physical quantity measuring method like that may be generally realized by controller(50) in FIG. 1.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To accomplish the object of the present invention, there is provided a physical quantity measuring method using a Brillouin optical fiber sensor including a step S1000 of setting an optical fiber 100 on a predetermined structure as a sensing structure; a step S2000 of selecting a pair of first and second pulse lights having different pulse widths; a step S3000 of sequentially transmitting the first and second pulse lights through the optical fiber 100 to obtain Brillouin gain spectra; a step S4000 of comparing the Brillouin gain spectra with each other to obtain a normal spectrum; a step S5000 of determining a Brillouin frequency having a peak value from the normal spectrum; and a step S6000 of multiplying the Brillouin frequency by a conversion factor of a physical quantity to be measured to calculate/obtain the physical quantity.

Preferably, the step of acquiring the Brillouin gain spectra includes the steps of transmitting the first pulse light having larger pulse width through the optical fiber and transmitting a corresponding probe light to obtain a first Brillouin gain spectrum, and transmitting the second pulse light having smaller pulse width through the optical fiber and transmitting a corresponding probe light to obtain a second Brillouin gain spectrum.

Preferably, the normal spectrum is obtained by dividing the first Brillouin gain spectrum by the second Brillouin gain spectrum.

Preferably, the step of obtaining the first Brillouin gain spectrum includes a step S3110 of setting the frequency of the corresponding probe light to the initial frequency of a predetermined frequency checking range; a step S3120 of transmitting the first pulse light and probe light to acquire a first back scattering light; a step S3130 of repeatedly acquiring the first back scattering light by the number of averaging times previously determined and averaging the repeatedly acquired first back scattering lights; a step S3140 of judging whether the repeated acquisition of the first back scattering light by the number of averaging times is completed; a step S3150 of repeating the steps from the step of acquiring the first back scattering light when the repeated acquisition of the first back scattering light by the number of averaging times is completed, and determining whether the frequency of the probe light corresponds to the final frequency of the frequency checking range when the repeated acquisition of the first back scattering light by the number of averaging times is not completed; a step S3160 of adding a frequency corresponding to the previously determined gradual frequency increase width to the frequency of the probe light and repeating the steps from the step of acquiring the first back scattering light when the frequency of the probe light does not correspond to the final frequency of the frequency checking range; and a step S3170 of accomplishing the first Brillouin gain spectrum with respect to the first back scattering light when the frequency of the probe light corresponds to the final frequency of the frequency checking range.

Preferably, the step of acquiring the second Brillouin gain spectrum includes a step S3210 of setting the frequency of the corresponding probe light to the initial frequency of a predetermined frequency checking range; a step S3220 of transmitting the second pulse light and probe light to acquire a second back scattering light; a step S3230 of repeatedly acquiring the second back scattering light by the number of averaging times previously determined and averaging the repeatedly acquired second back scattering lights; a step S3240 of judging whether the repeated acquisition of the second back scattering light by the number of averaging times is completed; a step S3250 of repeating the steps from the step of acquiring the second back scattering light when the repeated acquisition of the second back scattering light by the number of averaging times is not completed, and determining whether the frequency of the probe light corresponds to the final frequency of the frequency checking range when the repeated acquisition of the second back scattering light by the number of averaging times is completed; a step S3260 of adding a frequency corresponding to the previously determined gradual frequency increase width to the frequency of the probe light and repeating the steps from the step of acquiring the second back scattering light when the frequency of the probe light does not correspond to the final frequency of the frequency checking range; and a step S3270 of accomplishing the second Brillouin gain spectrum with respect to the second back scattering light when the frequency of the probe light corresponds to the final frequency of the frequency checking range.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 4 is a flow chart showing a physical quantity measuring method using a Brillouin optical fiber sensor according to the present invention;

FIG. 6b is a cross-sectional view taken along line A—A of FIG. 6a;

FIG. 7 is a Brillouin gain spectrum obtained according to the embodiment of FIG. 6a;

FIG. 8 is a graph showing strain measurement results obtained before and after signal processing is carried out for the structure of FIG. 6a.

DETAILED DESCRIPTION OF THE PREFERRED EMBODIMENT

Reference will now be made in detail to the preferred embodiments of the present invention, examples of which are illustrated in the accompanying drawings.

Figure 1:
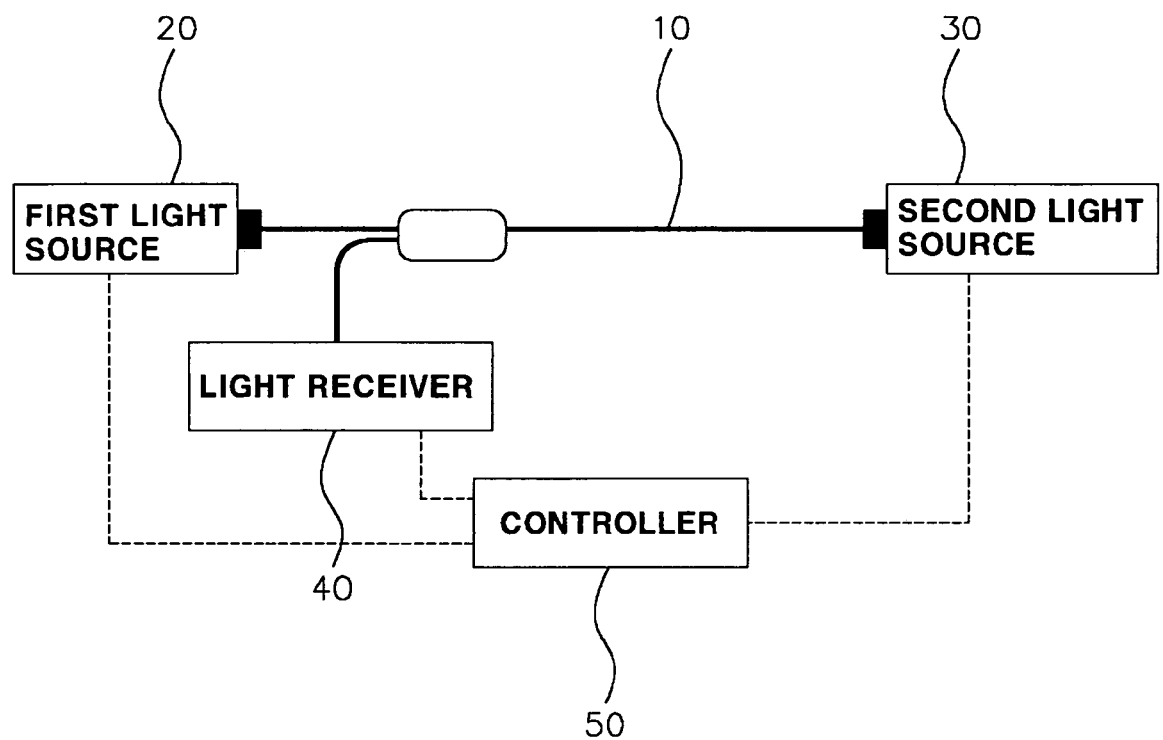
FIG. 1 shows the construction of a conventional Brillouin optical fiber sensor.
Figure 2:
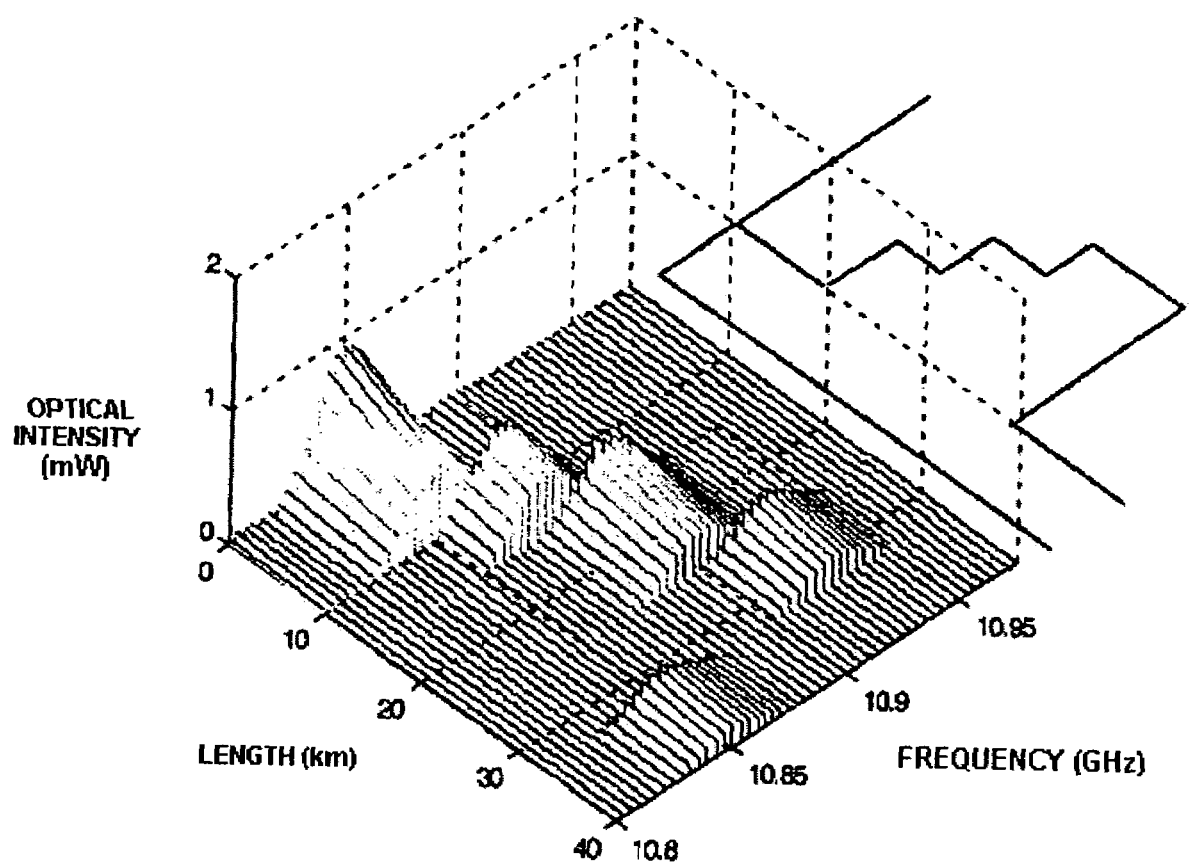
FIG. 2 shows a Brillouin gain spectrum obtained by measuring a temperature distribution of a specific structure using the Brillouin optical fiber sensor shown in FIG. 1.
Figure 3:
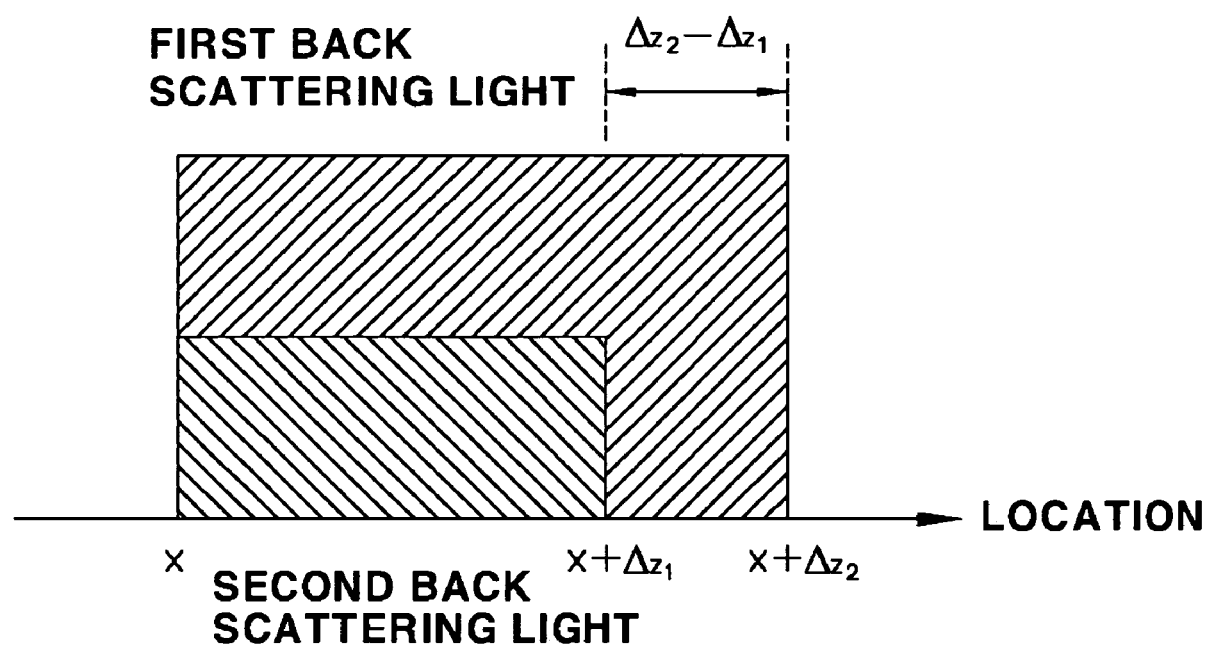
FIG. 3 illustrates back scattering light accumulation spaces in a fiber for explaining signal processing according to the present invention.

FIG. 3 shows back scattering light accumulation lengths in a fiber for explaining signal processing according to the present invention. The present invention uses pulse lights having different pulse widths and compares back scattering lights obtained from the pulse lights with each other to acquire a sensing signal in shorter sensing space.

FIG. 3 illustrates two spaces of Brillouin scattering lights obtained when two pulse lights having different pulse widths are sequentially transmitted through a single optical fiber. The two spaces of Brillouin scattering lights are shown at their locations in the optical fiber.

The first Brillouin scattering light is accumulated in a space ranging from x to $x+\Delta z_2$ and the second Brillouin scattering light is accumulated in a space ranging from x to $x+\Delta z_1$. A difference between the accumulated quantity of the first Brillouin scattering light and the accumulated quantity of the second Brillouin scattering light corresponds to the portion $\Delta z_2 - \Delta z_1$. The difference is smaller than the accumulated quantity of each of the first and second Brillouin scattering lights and thus smaller than the magnitude of spatial resolution obtained through each Brillouin scattering light, particularly, spatial resolution represented by the length of the optical fiber.

Consequently, a method capable of acquiring a sensing signal in shorter length of the optical fiber is provided. When the sensing signal is obtained from shorter optical fiber, it is said that the spatial resolution is enhanced. Accordingly, the present invention can improve the spatial resolution because the sensing signal can be acquired in shorter portion of the optical fiber from the difference between the Brillouin scattering lights.

The following Equations 1, 2 and 3 represent the principle of signal processing of the back scattering lights for enhancing the spatial resolution according to the present invention.

$$I^{(1)}(x, v) = I(L, v)\exp(-\alpha L)\exp\left[A_x^{x+\Delta z_2} g(z', v)\Delta I_{pu}(z', v)dz'\right] \quad \text{[Equation 1]}$$

$$I^{(2)}(x, v) = I(L, v)\exp(-\alpha L)\exp\left[A_x^{x+\Delta z_1} g(z', v)\Delta I_{pu}(z', v)dz'\right] \quad \text{[Equation 2]}$$

Equations 1 and 2 respectively represent intensities of back scattering lights obtained from the pulse lights having different pulse widths, which means Brillouin gain spectra. In Equations 1 and 2, x represents the position at which each back scattering light starts and I(L,v) means the intensity of each back scattering light. In addition, L is the length of the optical fiber and α denotes the attenuation coefficient of the optical fiber. Furthermore, g(z', v) represents a Brillouin gain factor and $\Delta I_{pu}(z',v)$ means the intensity of each pulse light.

In Equations 1 and 2, the range of each integral calculus has a difference corresponding to $\Delta z_2 - \Delta z_1$. Integral calculus from x to $x+\Delta z_1$ is included in each of Equations 1 and 2. The integral calculus from x to $x+\Delta z_1$ is eliminated when the second Brillouin gain spectrum is divided by the first Brillouin gain spectrum as represented by Equation 3 and thus a normal Brillouin gain spectrum is obtained.

$$NBGS(x, v) = \frac{I^{(2)}(x, v)}{I^{(1)}(x, v)} = ex\left[A_{x+\Delta z_1}^{x+\Delta z_2} g(z', v)\Delta I_{pu}(z', v)dz'\right] \quad \text{[Equation 3]}$$

In Equation 3, NBGS(x, v) represents the normal Brillouin gain spectrum. That is, NBGS(x, v) means back scattering light accumulated in the portion $\Delta z_2 - \Delta z_1$, which corresponds to the difference between the two back scattering lights.

When the difference between the back scattering lights is small, a sensing signal can be obtained even in shorter optical fiber portion. Accordingly, enhanced spatial resolution can be acquired. A Brillouin frequency obtained through the aforementioned signal processing can be used for calculating a corresponding physical quantity when multiplied by a conversion factor with respect to the physical quantity.

When the signal processing method according to the present invention, carried out through the above-described equations, is utilized, spatial resolution corresponding to 1 m or less of the optical fiber can be achieved while using a pulse width sufficiently larger than 10 nsec that is a critical value of generating a Brillouin gain. Furthermore, the normal Brillouin gain spectrum NBGS has reduced the broadening of the spectrum linewidth and the decreasing of the spectrum gain, when the spatial resolution is less than 5 m. Accordingly, in the case where a pulse light can be modulated into a pulse signal having very short rising time and falling time, spatial resolution can be reduced to less than 1 m through the signal processing method according to the present invention.

FIG. 4 is a flow chart showing the physical quantity measuring method using a Brillouin optical fiber sensor according to the present invention. The measuring method according to the present invention sets/selects a pair of pulse lights having different pulse widths and processes back scattering lights obtained when the pulse lights are transmitted through the same optical fiber using the aforementioned signal processing method. Then, a difference between the back scattering lights can be calculated as a ratio of gain spectra and a Brillouin frequency can be obtained based on a normal gain spectrum acquired from the ratio of gain spectra. A physical quantity can be measured from the Brillouin frequency. As described above, the Brillouin frequency is obtained using the ratio of gain spectra and calculated based on the difference between the back scattering lights so that the Brillouin frequency is smaller than the frequency of each back scattering light or each gain spectrum. Accordingly, a sensing signal can be easily acquired in shorter portion of the optical fiber.

Referring to FIG. 4, an optical fiber is set on a specific structure (for example, a building, a bridge, an airplane, a ship and so on) as a Brillouin sensing structure using a known method in the step S1000. Preferably, the optical fiber has a single strand, which is branched from a coupler structure and returned to the coupler structure. For signal processing of back scattering lights obtained when pulse lights are transmitted through the optical fiber, fundamental parameters including the number of averaging times, the number of samplings, a sampling rate, a frequency checking range, a gradual frequency increase space and so on are determined in advance. Then, arrangement for transmitting the pulse lights is finished.

In the step S2000, a pair of first and second pulse lights having different pulse width is selected. Preferably, the pulse width of the first pulse light is larger than the pulse width of the second pulse light. The pulse widths of the first and second pulse lights and/or a difference between the two pulse widths determine spatial resolution. Accordingly, it is preferable to previously select the pulse widths of the pulse lights based on the size (particularly, area) of the corresponding structure, arrangement structure of a sensed part of the optical fiber, and physical quantity to be sensed (temperature, load or strain).

Subsequently, the first and second pulse lights are sequentially transmitted through the optical fiber to obtain first and second back scattering lights. Then, a first Brillouin gain spectrum and a second Brillouin gain spectrum are acquired based on the obtained first and second back scattering lights in the step S3000. A process of acquiring each of the first and second Brillouin gain spectra will now be explained in more detail.

First of all, the first pulse light having larger pulse width is transmitted from one side of the optical fiber. Here, a continuous wave probe light is transmitted from the other side of the optical fiber and a specific physical quantity acts on the optical fiber. Accordingly, the first back scattering light having relatively large accumulation space is obtained, as described with reference to FIG. 3. The first Brillouin gain spectrum is obtained using Equation 1 in the step S3100.

Subsequently, the second pulse light is transmitted from one side of the optical fiber. Then, Brillouin scattering due to a probe light is generated in response to a corresponding physical quantity and thus the second back scattering light having an accumulation space smaller than that of the first back scattering light is obtained. The second Brillouin gain spectrum is obtained using Equation 2 in the step S3200. Consequently, the first and second Brillouin gain spectra are acquired using the first and second pulse lights.

A normal spectrum is obtained from the first and second Brillouin gain spectra using Equation 3. Specifically, the first Brillouin gain spectrum having larger accumulation space is divided by the second Brillouin gain spectrum having smaller accumulation space to obtain the normal spectrum corresponding to the ratio of the first Brillouin gain spectrum to the second Brillouin gain spectrum in the step S4000.

Then, a frequency with maximum power, that is, a Brillouin frequency, is found from the obtained normal spectrum in the step S5000. The Brillouin frequency is determined by a difference between the accumulation spaces of the first and second back scattering lights, that is, a portion smaller than the accumulation space of each back scattering light and thus enhanced spatial resolution can be provided. The Brillouin frequency is multiplied by a conversion factor of a corresponding physical quantity to finally obtain the physical quantity in the step S6000.

Figure 5A:
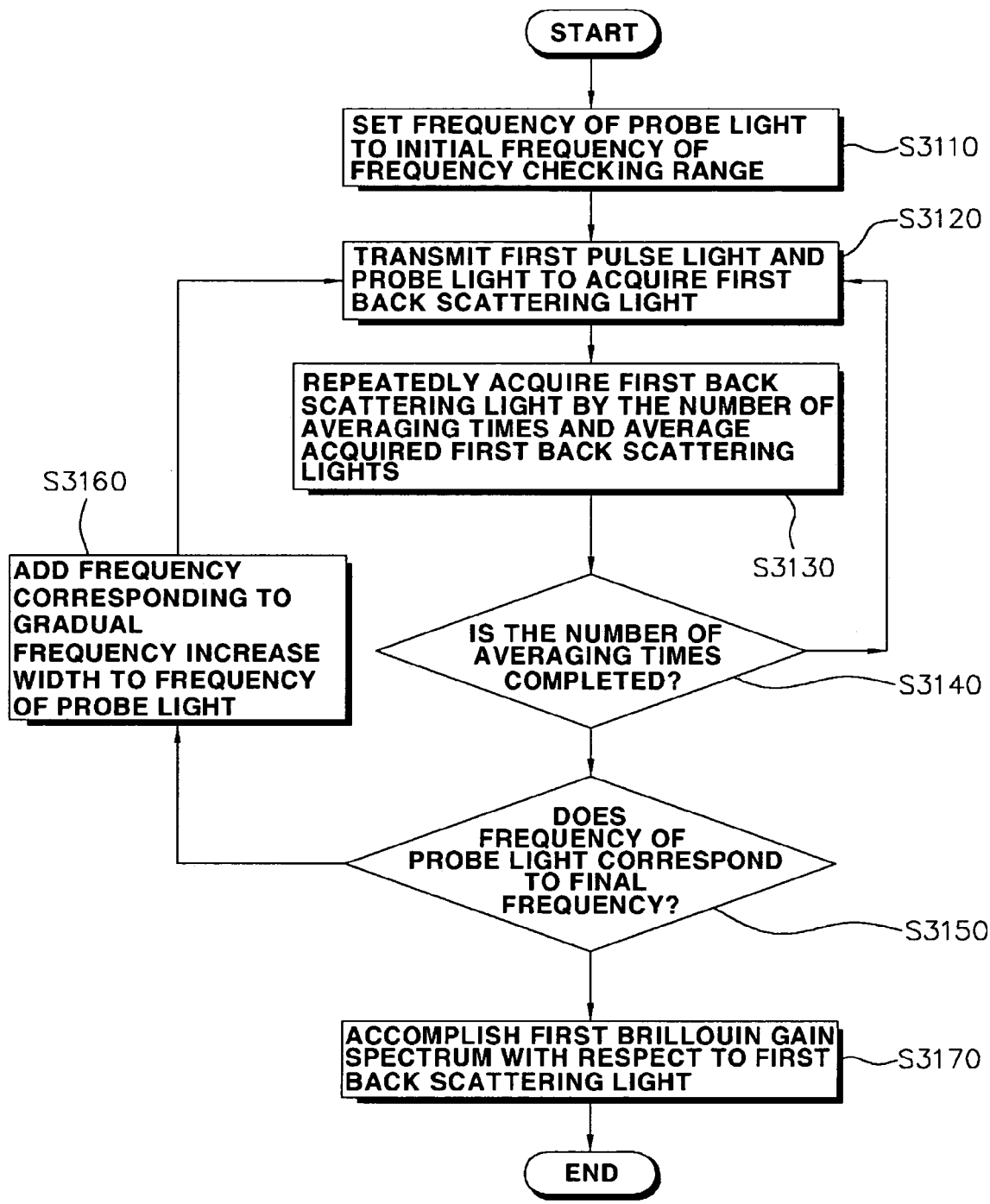
FIGS. 5a and 5b are flow charts respectively showing Brillouin gain spectrum obtaining processes shown in FIG. 4.
Figure 5B:
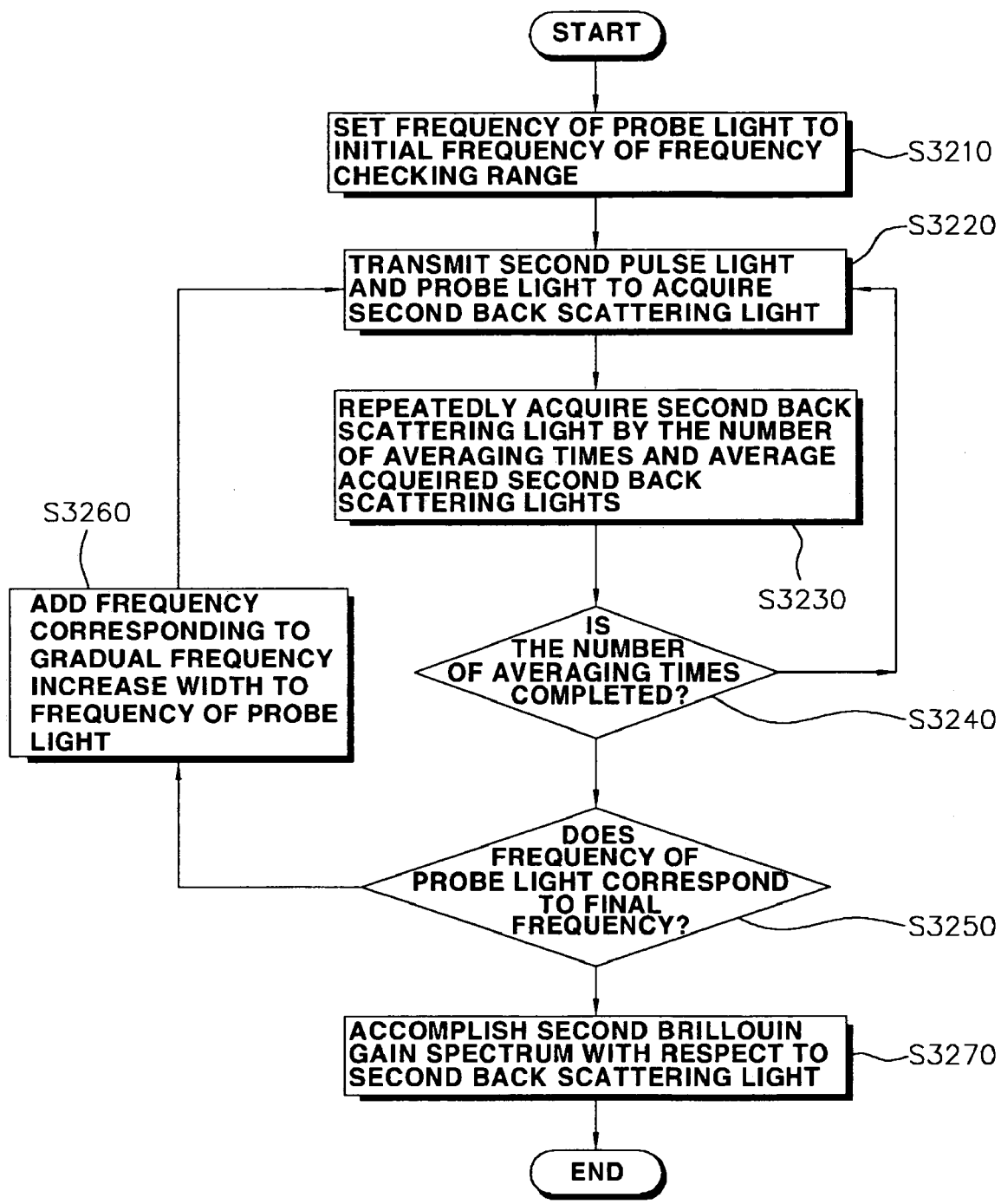

FIGS. 5a and 5b are flow charts respectively showing the steps of obtaining the first and second Brillouin gain spectra shown in FIG. 4. Referring to FIGS. 5a and 5b, to obtain the first and second Brillouin gain spectra, the frequency of the probe light is set to the initial frequency value of the frequency checking range determined at the fundamental parameter determining step in the steps S3110 and S3210. Then, the first and second pulse lights and probe light are transmitted through the optical fiber to obtain the first and second back scattering lights in the steps S3120 and S3220.

Subsequently, an averaging process that repeatedly acquires the back scattering lights by the number of averaging times, which is determined in the fundamental parameter determining step, is carried out in the steps S3130 and S3230. In the steps S3140 and S3240, it is checked whether the number of averaging times corresponds to the number of averaging times determined in the fundamental parameter determining step. If the determined number of averaging times is 30, acquisition of each back scattering light is repeated 30 times.

When the number of averaging times is satisfied, the following step is carried out. When the number of averaging times is not satisfied, the processes are returned to the steps of obtaining the back scattering lights S3120 and S3220 to repeat the steps S3120, S3220, S3130 and S3230. When the number of averaging times is satisfied, it is determined whether the current frequency of the probe light is the final frequency of the previously set frequency checking range in the steps S3150 and S3250. When the current frequency of the probe light is not the final frequency, a frequency corresponding to the gradual frequency increase width, previously determined, is added to the frequency of the probe light in the steps S3160 and S3260. Then, the processes go to the steps S3120 and S3220 to carry out the aforementioned steps.

When the frequency of the probe light is the final frequency, the first and second Brillouin gain spectra with respect to the first and second back scattering lights are accomplished in the steps S3170 and S3270. Through the above-described steps, the processes S3100 and S3200 for obtaining the first and second Brillouin gain spectra can be carried out.

Figure 6A:
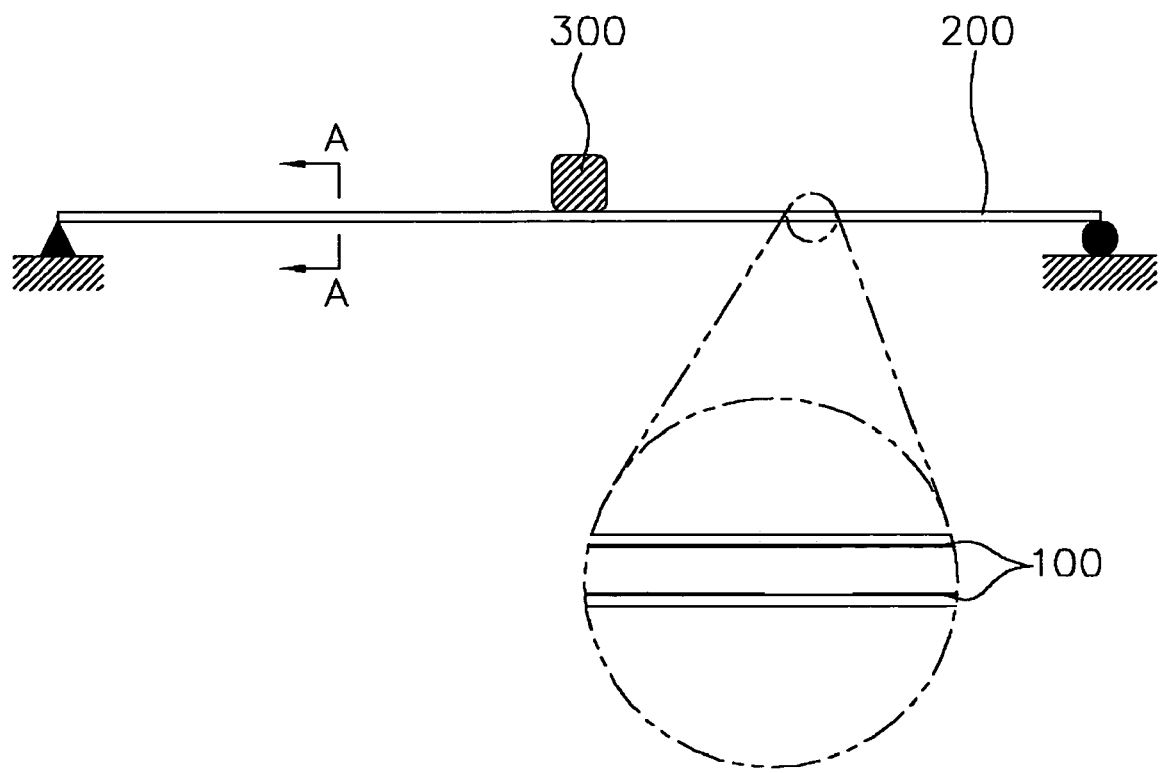
FIG. 6a shows an embodiment in which the measuring method of the present invention is applied to a beam-shaped structure.
Figure 6B:
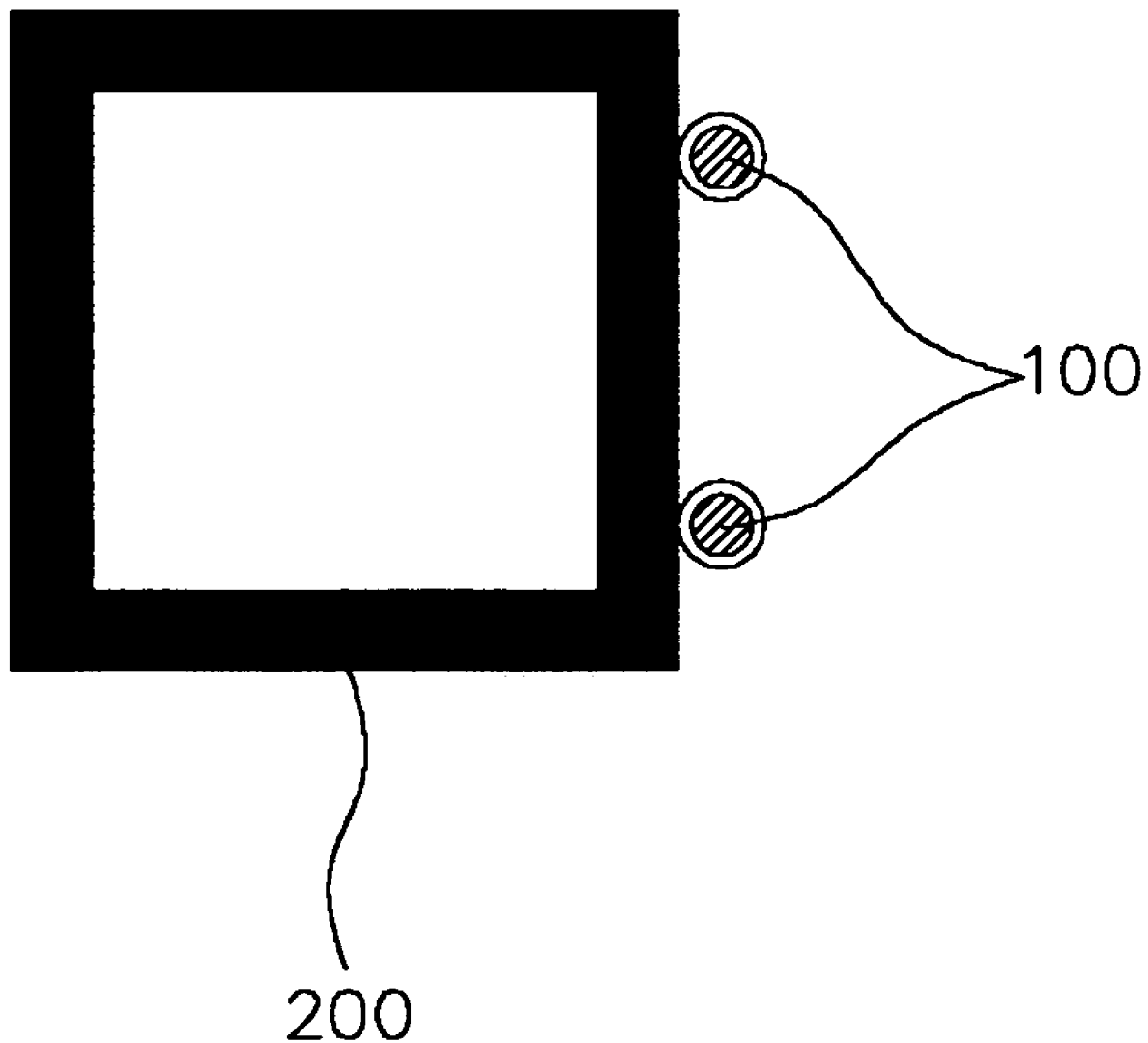
Figure 7:
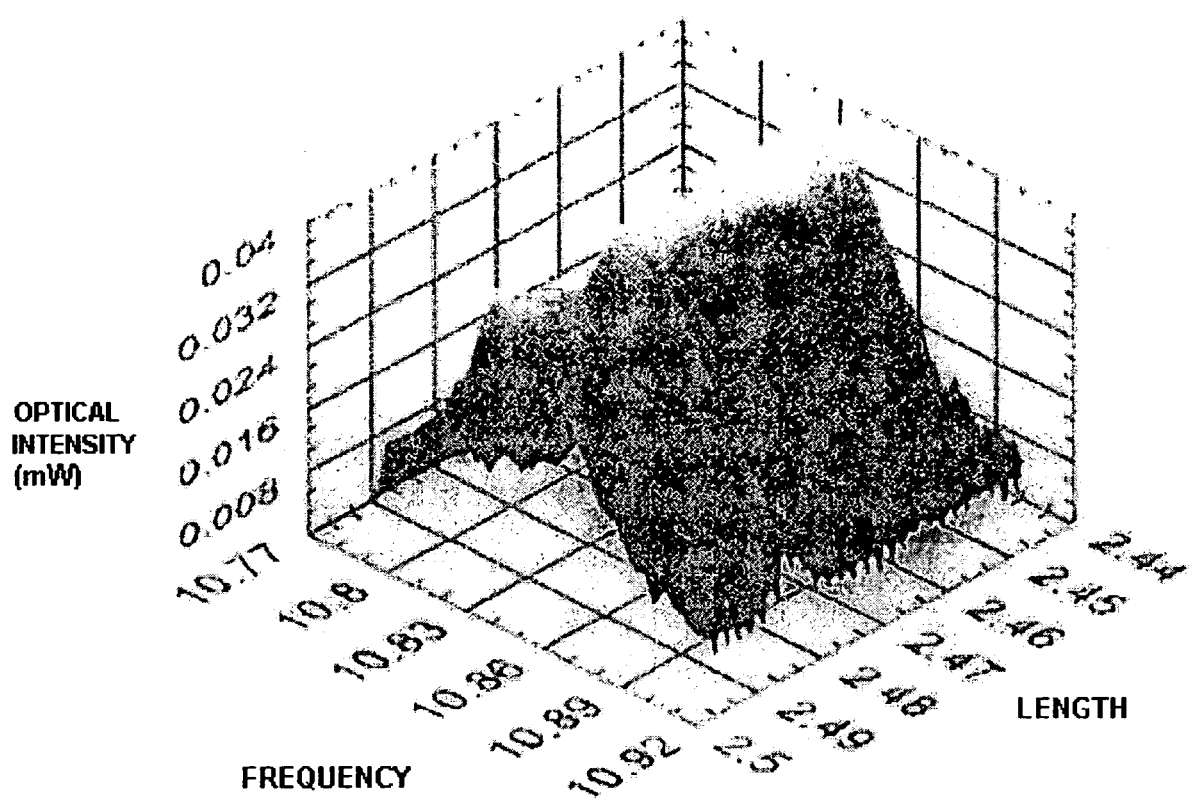

FIG. 6a shows an embodiment in which the measuring method of the present invention is applied to a beam-shaped structure, and FIG. 6b is a cross-sectional view taken along line A—A of FIG. 6a. FIG. 7 is a Brillouin gain spectrum obtained according to the embodiment of FIG. 6a. Referring to FIGS. 6a and 6b, an optical fiber 100 is attached to a beam-shaped structure 200 and the measuring method of the present invention is executed.

The beam-shaped structure 200 is a hollow simple beam. The cross section of the beam 200 has a square shape and both ends of the beam 200 are supported. In this embodiment, the beam 200 with a length of approximately 8 m is installed and the optical fiber 100 with a length of approximately 4 km is set on the surface of the beam 200. In addition, a weight 300 of approximately 200 g is put on a specific position of the beam 200 such that a physical quantity is applied to the beam 200 to bring about concentrated load. Load caused by the beam 200 also acts on the beam.

The first and second pulse lights are transmitted through the optical fiber 100 set on the beam 200 and the frequency of the probe light is increased within the frequency checking range set in the fundamental parameter determining step based on the previously determined gradual frequency increase width. The first and second back scattering lights are measured while the frequency of the probe light is gradually increased from the initial frequency to the final frequency of the frequency checking range. Then, the Brillouin gain spectrum shown in FIG. 7 is obtained.

In the Brillouin gain spectrum of FIG. 7, strain caused by the weight of the beam 200 and the concentrated load due to the weight 300 is sensed mainly from a distance ranging from 2.44 km to 2.5 km. A frequency range corresponding to the distance is 10.77 to 10.92 GHz, and optical intensity corresponding to the frequency range is 0.007 mW to 0.047 mW. Here, a frequency having a peak value among frequencies obtained in the length direction of the optical fiber 100 is the Brillouin frequency.

Figure 8:
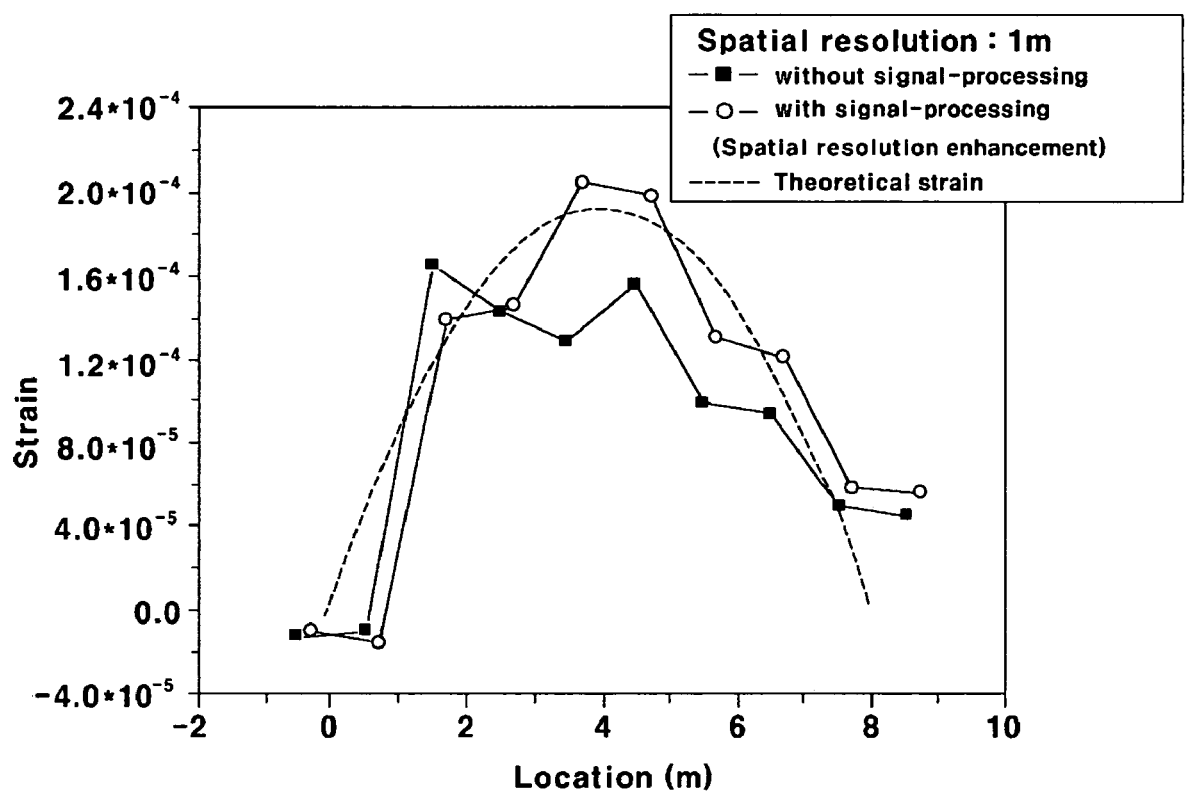

FIG. 8 is a graph showing strain measurement results obtained before and after signal processing is carried out for the structure of FIG. 6a. In the graph of FIG. 8, X-axis represents location in the unit of meter and Y-axis represent strain. When the Brillouin frequency obtained in the aforementioned embodiment is calculated using the following equation, strain after signal processing, as shown in FIG. 8, is obtained.

$$\varepsilon = \frac{1}{C}(v_b - v_{b0}) \qquad \text{[Equation 4]}$$

In Equation 4, $v_{b0}$ means a Brillouin frequency when there is no strain and $v_b$ means a Brillouin frequency when there is strain. In addition, C is a strain factor. The strain represented by $\varepsilon$ is calculated based on $v_{b0}$, $v_b$ and C.

A process for obtaining the strain result after signal processing will now be explained in detail.

First of all, fundamental parameters are determined such that the frequency checking range is set to 10.79 MHz to 10.89 MHz, gradual frequency increase width is set to 1 MHz, and the number of averaging times is set to 200. The first and second pulse lights respectively having pulse widths 100 nsec and 90 nsec are selected. The first pulse light having the pulse width of 100 nsec is input into the optical fiber while the initial frequency of the probe light is set to 10.79 GHz, and a back scattering light is repeatedly acquired 200 times and averaged. Subsequently, the back scattering light is acquired 200 times while the frequency of the probe light is gradually increased by 1 MHz and the acquired back scattering lights are averaged. This process is repeated until the frequency of the probe light becomes the final frequency 10.89 GHz. Then, the first back scattering light spectrum, that is, the first Brillouin gain spectrum, represented by Equation 1, is obtained.

The aforementioned process is carried out again using the second pulse light having the pulse width of 90 nsec to obtain the second Brillouin gain spectrum represented by Equation 2. Subsequently, the second Brillouin gain spectrum is divided by the first Brillouin gain spectrum using Equation 3 to obtain a signal having spatial resolution of 1 m. Accordingly, the normal Brillouin gain spectrum can be acquired. Then, the Brillouin frequency representing the maximum power is obtained and converted into strain through Equation 4 to obtain strain distribution after signal processing as shown in FIG. 8. Strain distribution data before signal processing, shown in FIG. 8, is obtained using a pumping pulse light with a pulse width of 50 nsec. From the strain distributions without and with signal processing, it can be known that the signal processing method according to the present invention produces satisfactory results.

Figure 9:
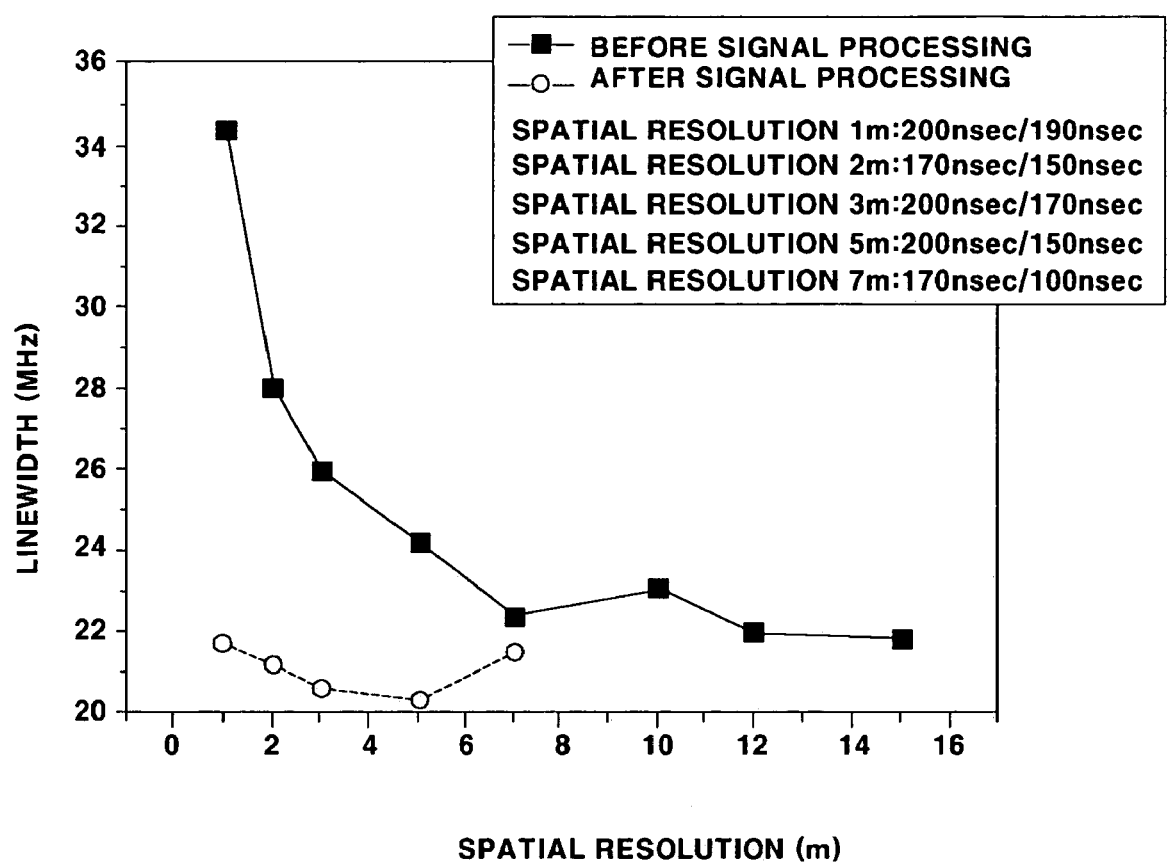
FIG. 9 is a graph showing the relationship between spectrum line widths before and after signal processing according to the present invention and spatial resolution.

FIG. 9 is a graph showing the relationship between spectrum linewidths before and after signal processing according to the present invention and spatial resolution. In the graph of FIG. 9, X-axis represents the spatial resolution in the unit of meter and Y-axis represents the linewidth in the unit of MHz. The linewidth with respect to spatial resolution of 1 m before signal processing is increased approximately more than 50% compared to the linewidth with respect to spatial resolution of 10 m. However, it is confirmed that the linewidth is almost uniform after signal processing. This means that accuracy in the determination of the peak of the Brillouin gain spectrum is improved and thus accuracy in the measurement of a physical quantity is improved when signal processing for enhancing the spatial resolution according to the present invention is carried out.

While the optical fiber 100 having the length of 4 km is used in the above-described embodiment using the simple beam 200, the length of the optical fiber 100 can be varied with the structure and size of a corresponding structure, a physical quantity to be measured and so on. Furthermore, while the strain is measured in the aforementioned embodiment of the present invention, a temperature caused by generation of heat can be also measured using the measuring method of the present invention.

According to the physical quantity measuring method using a Brillouin optical fiber sensor according to the present invention, the normal spectrum is calculated by using a pair of pulse lights and comparing obtained gain spectra to each other. The Brillouin frequency is acquired based on the normal spectrum and thus a sensing signal can be obtained in a short optical fiber portion and spatial resolution can be remarkably enhanced.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A physical quantity measuring method using a Brillouin optical fiber sensor comprising:
   a step S1000 of setting an optical fiber 100 on a predetermined structure as a sensing structure;
   a step S2000 of selecting a pair of first and second pulse lights having different pulse widths;

a step S3000 of sequentially transmitting the first and second pulse lights through the optical fiber 100 to obtain Brillouin gain spectra;

a step S4000 of comparing the Brillouin gain spectra with each other to obtain a normal spectrum;

a step S5000 of determining a Brillouin frequency having a peak value from the normal spectrum; and a step S6000 of multiplying the Brillouin frequency by a conversion factor of a physical quantity to be measured resulting in a measurement of the physical quantity wherein the measurement is outputted as a signal;

wherein the normal spectrum is obtained using the following equation, $$NBGS(x, v) = \frac{I^{(2)}(x, v)}{I^{(1)}(x, v)} = \exp\left[\int_{x+\Delta z_1}^{x+\Delta z_2} g(z', v)\Delta I_{pu}(z', v)dz'\right]$$

wherein NBGS(x,v) represents the normalized Brillouin gain spectrum, which means back scattering lights accumulated in the portion corresponding to $\Delta z_2 - \Delta z_1$, $I^{(1)}(x,v)$ denotes the first Brillouin gain spectrum, $I^{(2)}(x,v)$ represents the second Brillouin gain spectrum, x means the position where each back scattering light starts, $g(z',v)$ represents a Brillouin gain factor, and $\Delta I_{pu}(z',v)$ denotes the intensity of each pulse light.

2. The physical quantity measuring method as claimed in claim 1, wherein the optical fiber has a single strand, which is branched from a coupler structure and returned to the coupler structure.

3. The physical quantity measuring method as claimed in claim 1, wherein fundamental parameters including the number of averaging times, the number of samplings, a frequency checking range, and a gradual frequency increase width are determined in advance for signal processing of back scattering lights acquired when the pulse lights are transmitted.

4. The physical quantity measuring method as claimed in claim 3, wherein the number of averaging times is 200, the frequency checking range is 10.79 MHz to 10.89 MHz, the gradual frequency increase width is 1 MHz, the pulse width of the first pulse light is 100 nsec, and the pulse width of the second pulse light is 90 nsec.

5. The physical quantity measuring method as claimed in claim 1, wherein the pulse width of the first pulse light is larger than the pulse width of the second pulse light.

6. The physical quantity measuring method as claimed in claim 1, wherein the step of acquiring the Brillouin gain spectra comprises the steps of:

transmitting the first pulse light having larger pulse width through the optical fiber and transmitting a corresponding probe light to obtain a first Brillouin gain spectrum; and transmitting the second pulse light having smaller pulse width through the optical fiber and transmitting a corresponding probe light to obtain a second Brillouin gain spectrum.

7. The physical quantity measuring method as claimed in claim 6, wherein the step of obtaining the first Brillouin gain spectrum comprises the steps of:

setting the frequency of the corresponding probe light to the initial frequency of a predetermined frequency checking range;

transmitting the first pulse light and probe light to acquire a first back scattering light;

repeatedly acquiring the first back scattering light by the number of averaging times previously determined and averaging the repeatedly acquired first back scattering lights;

judging whether the repeated acquisition of the first back scattering light by the number of averaging times is completed;

repeating the steps from the step of acquiring the first back scattering light when the repeated acquisition of the first back scattering light by the number of averaging times is completed, and determining whether the frequency of the probe light corresponds to the final frequency of the frequency checking range when the repeated acquisition of the first back scattering light by the number of averaging times is not completed;

adding a frequency corresponding to the previously determined gradual frequency increase width to the frequency of the probe light and repeating the steps from the step of acquiring the first back scattering light when the frequency of the probe light does not correspond to the final frequency of the frequency checking range; and accomplishing the first Brillouin gain spectrum with respect to the first back scattering light when the frequency of the probe light corresponds to the final frequency of the frequency checking range.

8. The physical quantity measuring method as claimed in claim 7, wherein the first Brillouin gain spectrum is represented by the following equation, $$I^{(1)}(x, v) = I(L, v)\exp(-\alpha L)\exp\left[\int_{x}^{x+\Delta z_2} g(z', v)\Delta I_{pu}(z', v)dz'\right]$$

wherein $I^{(1)}(x,v)$ denotes the intensity of the back scattering light obtained from the first pulse light, which means the first Brillouin gain spectrum, x represents the position at which the back scattering light starts, $I(L,v)$ means the intensity of the back scattering light, L is the length of the optical fiber, $\alpha$ denotes the loss factor of the optical fiber, $g(z',v)$ represents a Brillouin gain factor, and $\Delta I_{pu}(z',v)$ denotes the intensity of the pulse light.

9. The physical quantity measuring method as claimed in claim 7, wherein the number of averaging times is 200, the frequency checking range is 10.79 MHz to 10.89 MHz, the gradual frequency increase width is 1 MHz, and the pulse width of the first pulse light is 100 nsec.

10. The physical quantity measuring method as claimed in claim 6, wherein the step of acquiring the second Brillouin gain spectrum comprises the steps of:

setting the frequency of the corresponding probe light to the initial frequency of a predetermined frequency checking range;

transmitting the second pulse light and probe light to acquire a second back scattering light;

repeatedly acquiring the second back scattering light by the number of averaging times previously determined and averaging the repeatedly acquired second back scattering lights;

judging whether the repeated acquisition of the second back scattering light by the number of averaging times is completed;

repeating the steps from the step of acquiring the second back scattering light when the repeated acquisition of the second back scattering light by the number of averaging times is completed, and determining whether the frequency of the probe light corresponds to the final frequency of the frequency checking range when the repeated acquisition of the second back scattering light by the number of averaging times is not completed;

adding a frequency corresponding to the previously determined gradual frequency increase width to the frequency of the probe light and repeating the steps from the step of acquiring the second back scattering light when the frequency of the probe light does not correspond to the final frequency of the frequency checking range; and accomplishing the second Brillouin gain spectrum with respect to the second back scattering light when the frequency of the probe light corresponds to the final frequency of the frequency checking range.

11. The physical quantity measuring method as claimed in claim 10, wherein the second Brillouin gain spectrum is represented by the following equation, $$I^{(2)}(x, v) = I(L, v)\exp(-\alpha L)\exp\left[\int_{x}^{x+\Delta z_1} g(z', v)\Delta I_{pu}(z', v)\,dz'\right]$$

wherein $I^{(2)}(x,v)$ denotes the intensity of the back scattering light obtained from the second pulse light, which means the second Brillouin gain spectrum, x represents the position at which the back scattering light starts, $I(L,v)$ means the intensity of the back scattering light, L is the length of the optical fiber, $\alpha$ denotes the loss factor of the optical fiber, $g(z',v)$ represents a Brillouin gain factor, and $\Delta I_{pu}(z',v)$ denotes the intensity of the pulse light.

12. The physical quantity measuring method as claimed in claim 10, wherein the number of averaging times is 200, the frequency checking range is 10.79 MHz to 10.89 MHz, the gradual frequency increase width is 1 MHz, and the pulse width of the second pulse light is 90 nsec.

13. The physical quantity measuring method as claimed in claim 1, wherein the structure is a hollow simple beam with a length of approximately 8 m, both ends of the beam being supported and the cross section of the beam having a square shape.

14. The physical quantity measuring method as claimed in claim 13, wherein strain is sensed mainly in a portion of approximately 2.44 km to 2.5 km when an optical fiber with a length of approximately 4 km is set on the surface of the beam and a concentrated load of a weight of approximately 200 g is applied to the beam.

* * * * *